(12) United States Patent
El Husseini et al.

(10) Patent No.: US 8,171,538 B2
(45) Date of Patent: May 1, 2012

(54) AUTHENTICATION AND AUTHORIZATION OF EXTRANET CLIENTS TO A SECURE INTRANET BUSINESS APPLICATION IN A PERIMETER NETWORK TOPOLOGY

(75) Inventors: Ahmad M. El Husseini, Kirkland, WA (US); Arif Kureshy, Sammamish, WA (US); Dmitry Zhiyanov, Woodinville, WA (US); Karl Tolgu, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1160 days.

(21) Appl. No.: 11/378,855

(22) Filed: Mar. 17, 2006

(65) Prior Publication Data

US 2007/0220154 A1 Sep. 20, 2007

(51) Int. Cl.
*H04L 29/06* (2006.01)
(52) U.S. Cl. .......................................... 726/12
(58) Field of Classification Search .................. 726/17, 726/11, 4, 14, 7, 12; 380/229, 4, 11
See application file for complete search history.

(56) References Cited

U.S. PATENT DOCUMENTS

| | | | |
|---|---|---|---|
| 5,586,260 A * | 12/1996 | Hu ................................. | 726/12 |
| 6,317,838 B1 * | 11/2001 | Baize ............................. | 726/11 |
| 6,584,567 B1 * | 6/2003 | Bellwood et al. ............. | 713/171 |
| 6,598,167 B2 * | 7/2003 | Devine et al. .................... | 726/8 |
| 6,877,095 B1 * | 4/2005 | Allen ............................ | 713/182 |
| 7,249,377 B1 * | 7/2007 | Lita et al. ........................ | 726/12 |
| 2002/0169980 A1 * | 11/2002 | Brownell ...................... | 713/201 |
| 2003/0014623 A1 * | 1/2003 | Freed et al. .................... | 713/150 |
| 2003/0065950 A1 * | 4/2003 | Yarborough ................... | 713/201 |
| 2003/0191971 A1 * | 10/2003 | Klensin et al. ................ | 713/201 |
| 2004/0034793 A1 * | 2/2004 | Yuan ............................ | 713/200 |
| 2004/0139350 A1 * | 7/2004 | Lyon et al. .................... | 713/201 |
| 2006/0004662 A1 * | 1/2006 | Nadalin et al. .................. | 705/50 |

* cited by examiner

*Primary Examiner* — Benjamin Lanier
*Assistant Examiner* — Cordelia Zecher

(57) ABSTRACT

Methods and systems authenticate and authorize an extranet client to a secure intranet business application with a perimeter network topology, where connections to the secure intranet business application from outside the secure intranet are not permitted. A perimeter network proxy is authenticated within the secure intranet. The perimeter network proxy corresponds to an authenticated extranet client. If the perimeter network proxy is authenticated, information on an intranet business application client is acquired and used to create a session with the intranet business application. The intranet business application client corresponds to the extranet client, and the extranet client uses the session to submit requests to the intranet business application.

16 Claims, 9 Drawing Sheets

AUTHENTICATION AND AUTHORIZATION OF EXTRANET CLIENTS TO A SECURE INTRANET BUSINESS APPLICATION IN A PERIMETER NETWORK TOPOLOGY

BACKGROUND

Security is an important feature of any server-based product that automates processes and managed data. In particular, with an enterprise resource planning (ERP) system, there is often a need to provide users with access to business systems and business applications in a secure manner. For example, in a traditional perimeter network (TPN) topology, two connected networks separated by a firewall are provided: a demilitarized zone (DMZ), also referred to as a perimeter network, and a secure intranet, also referred to as an internal network. The perimeter network is accessible from an extranet, such as the Internet, and access between the perimeter network and the extranet is controlled by a firewall. The secure intranet hosts a business application and/or a business database. Because unauthorized access may occur between an extranet user and the perimeter network, there is a one-way trust relationship from the perimeter network to the intranet, such that the perimeter network trusts the intranet, but the intranet does not trust the perimeter network. As a result, while the secure intranet may authenticate and authorized internal users, such as users having an intranet business application account and identification, the secure intranet does not authenticate and authorize extranet clients accessing the secure intranet via the perimeter network even if the extranet client is also a business application user.

Although client-side authentication, such as Windows authentication from a Windows domain account, may be used to access a secure intranet business application, the intranet business application may inherently limit the extent to which an authenticated client's credentials may be subsequently reused for authorization purposes in the intranet business application. As a result, in a TPN topology, an extranet client may authenticate against the perimeter network using client-side authentication, but because the intranet does not cross the perimeter network, the intranet does not authenticate the extranet client based on the client-side authentication because the identity of the extranet client is maintained in the perimeter network.

In addition, an extranet client may submit a request to be processed by the intranet business application in an off-line scenario, such that the extranet user is no longer available. In other words, a live user context no longer exists for authentication and authorization in order to process the request.

SUMMARY

External clients are able to be mapped to intranet business application clients and granted access to the intranet business application within a perimeter network topology. Requests from offline external clients may be processed based on previous authentication of the external client. Broadly, a perimeter network proxy is authenticated from within the secure intranet, where the perimeter network proxy corresponds to an extranet client authenticated outside of the intranet. An authenticated perimeter network proxy results in business application client information being acquired and used to create a session. The external client may use the session to submit business application requests and utilize the intranet business application. The method and system of authorization is expected to allow external users to use the intranet business application within a secure intranet while maintaining security. Further, external clients may be authorized, submit a request and subsequently go offline, yet the intranet business application may still process the request.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
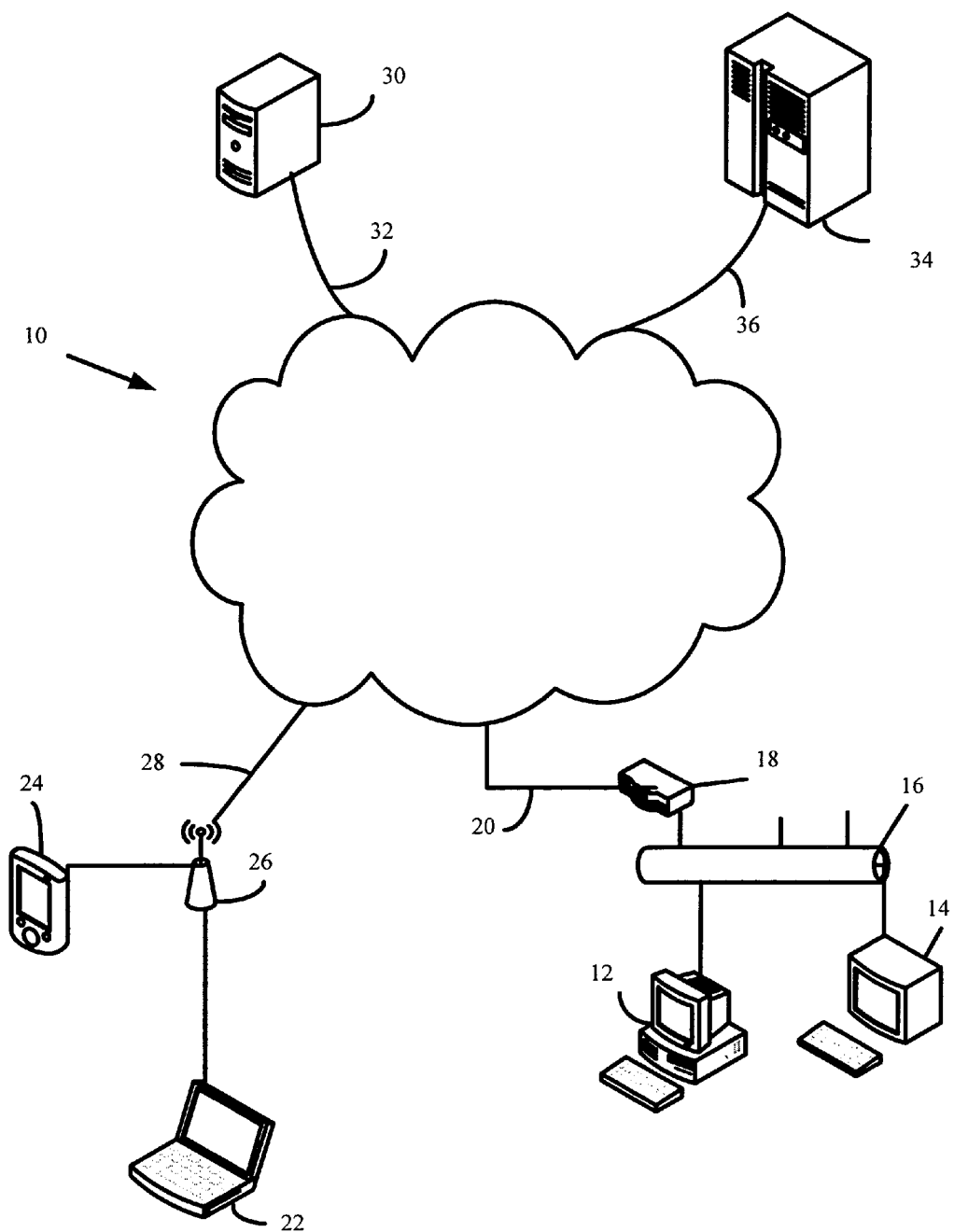
FIG. 1 is a simplified and representative block diagram of a computer network.
Figure 2:
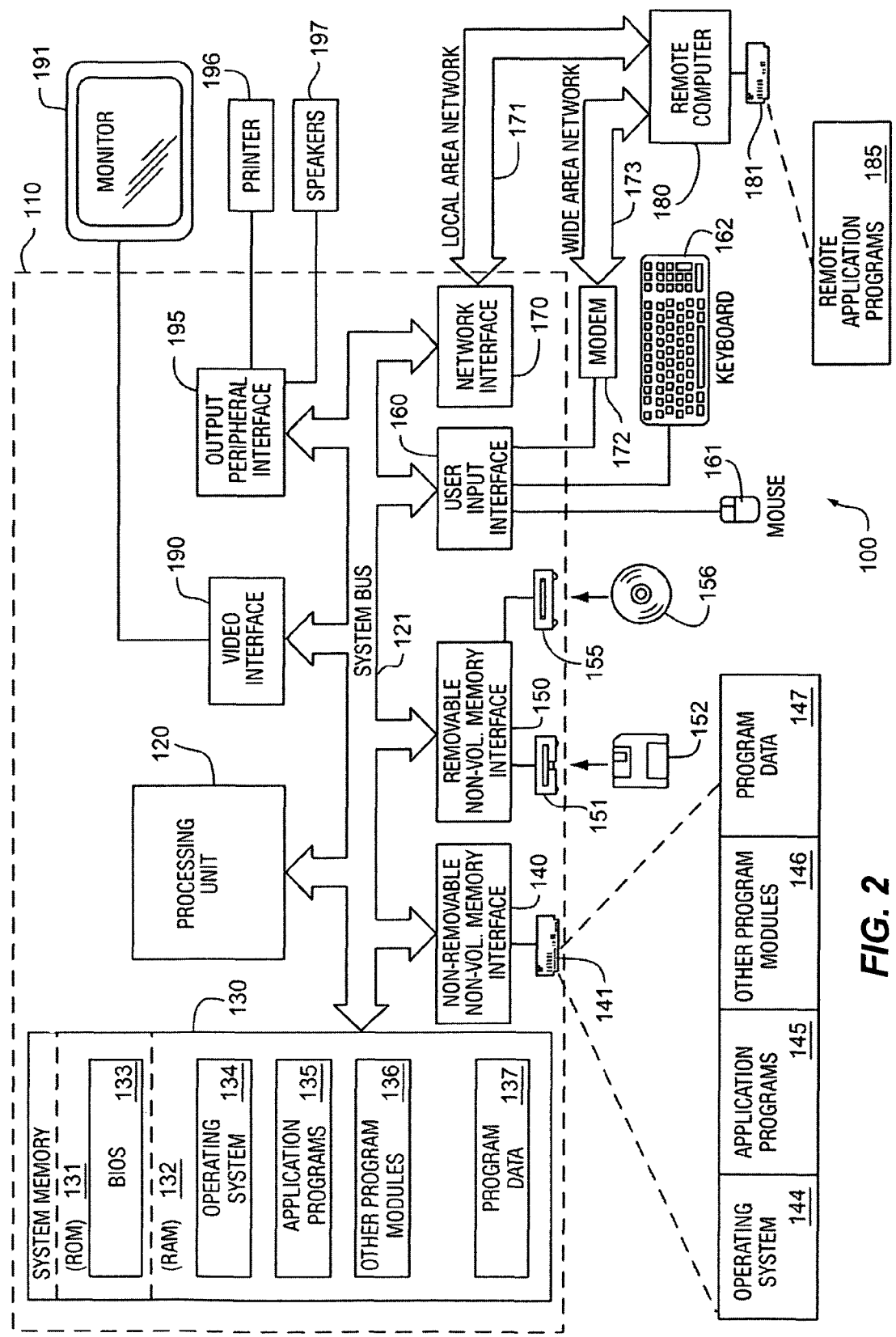
FIG. 2 is a block diagram of a computer that may be connected to the network of FIG. 1.

FIGS. 1 and 2 provide a structural basis for the network and computational platforms related to the instant disclosure.

FIG. 1 illustrates a network 10. The network 10 may be the Internet, a virtual private network (VPN), or any other network that allows one or more computers, communication devices, databases, etc., to be communicatively connected to each other. The network 10 may be connected to a personal computer 12, and a computer terminal 14 via an Ethernet 16 and a router 18, and a landline 20. The Ethernet 16 may be a subnet of a larger Internet Protocol network. Other networked resources, such as projectors or printers (not depicted), may also be supported via the Ethernet 16 or another data network. On the other hand, the network 10 may be wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36. The network 10 may be useful for supporting peer-to-peer network traffic.

FIG. 2 illustrates a computing device in the form of a computer 110. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programmings 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programmings 145, other program modules 146, and program data 147. Note that these components can either be the same as or different from operating system 134, application programmings 135, other program modules 136, and program data 137. Operating system 144, application programmings 145, other program modules 146, and program data 147 are given different numbers here to illustrate that, at a minimum, they are different copies. A user may enter commands and information into the computer 20 through input devices such as a keyboard 162 and cursor control device 161, commonly referred to as a mouse, trackball or touch pad. A camera 163, such as web camera (webcam), may capture and input pictures of an environment associated with the computer 110, such as providing pictures of users. The webcam 163 may capture pictures on demand, for example, when instructed by a user, or may take pictures periodically under the control of the computer 110. Other input devices (not shown) may include a microphone, joystick, game pad, satellite dish, scanner, or the like. These and other input devices are often connected to the processing unit 120 through an input interface 160 that is coupled to the system bus, but may be connected by other interface and bus structures, such as a parallel port, game port or a universal serial bus (USB). A monitor 191 or other type of display device is also connected to the system bus 121 via an interface, such as a graphics controller 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the input interface 160, or other appropriate mechanism. In a networked environment, program modules depicted relative to the computer 110, or portions thereof, may be stored in the remote memory storage device. By way of example, and not limitation, FIG. 2 illustrates remote application programmings 185 as residing on memory device 181.

The communications connections 170, 172 allow the device to communicate with other devices. The communications connections 170, 172 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Figure 3:
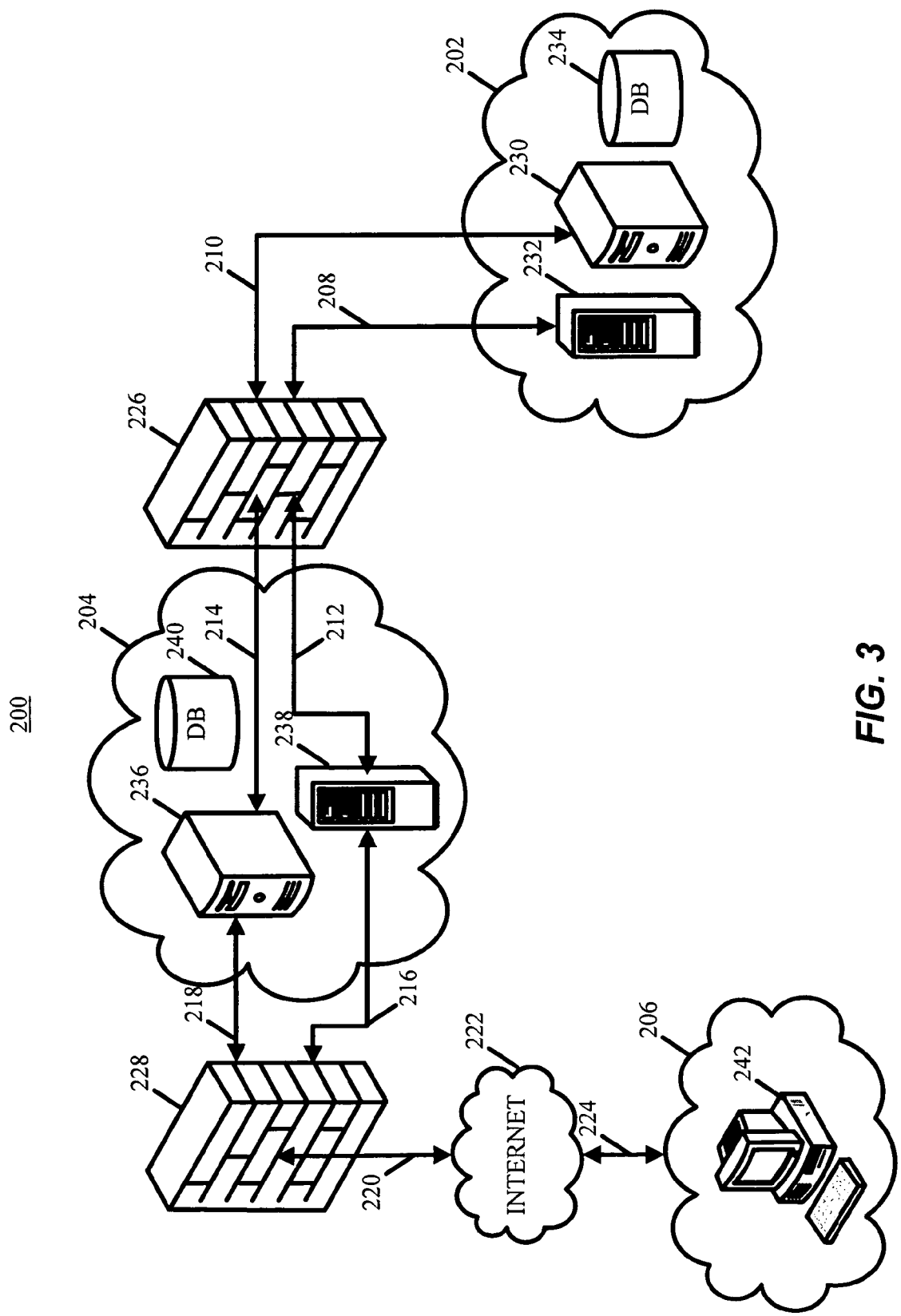
FIG. 3 is a representative block diagram of a perimeter network topology system for allowing extranet clients to access a secure intranet system.

FIG. 3 may depict an exemplary client/server network 200, such as an enterprise resource planning (ERP) system, that may be similar to or coupled to the network of FIG. 1 and may be provided as a traditional perimeter network (TPN) topology. A client/server network 200 may include individual systems 202, 204, 206 coupled via networks 208, 210, 212, 214, 216, 218, 220, 222, 224. The networks 208, 210, 212, 214, 216, 218, 220, 222, 224 may be wired or wireless and may support Internet protocol version 6 (IPv6) and secure dedications protocol, such as secure sockets layer (SSL). In one example, the Internet may be utilized as the network 222. Systems 202, 204 are separated by a firewall 226, or other network border protection device or filter, and access between systems 204, 206 may be controlled by a firewall 228, which may be provided via a secure server, such as an Internet Security and Acceleration (ISA) server.

System 202 is a secure intranet system, which may include one server 230 or multiple servers, a domain controller 232 and a database 234. In one example, the server 230 is a business application server which hosts a business application. The secure intranet system 202 may be an enterprise resource planning (ERP) server system or other business enterprise server system, application server system, and SQL or other database management server system, or a messaging and enterprise collaboration server system, though different server types or server utilizations may be included. The domain controller 232 may manage internal intranet users in order to authenticate and authorize users of the intranet business application. The database 234 may be a business application database.

System 204 a perimeter network system, also referred to as a demilitarized zone (DMZ), which may include at least one server 236 or multiple servers, a domain controller 238 and a database 240. In one example, the server 236 may be an Internet information services (IIS) server offering sharepoint services, and may further act as a portal, such as an Internet or Web portal, for extranet client to the secure intranet system 202. The domain controller 238 may manage extranet clients or other external users in order to authenticate and authorize extranet clients to the perimeter network system 204, for example external users accessing the perimeter network system 204 via the Internet 222. Generally, the domain controller 238 trusts the domain controller 232 of the secure intranet system 202, but not vice versa. As such, the perimeter network trusts the secure intranet system 202, but the secure intranet system 202 does not trust, and may not permit, connections originating outside of the secure intranet system 202. The database 240 may be a sharepoint database.

System 206 is a client system which may include a network communication device 242, including, but not limited to, a personal computer, a telephone, a personal digital assistant, a set-top box, a television, an entertainment system, and the like. In one example, the network communication device 216 may include, or be operatively coupled to, a client application, such as an Internet browser and/or an operating system. The client application may include a domain account, such as a Windows domain account. Using the domain account, the client system 206 may conduct client-side authentication and authorization by authenticating against the server 236. However, it should be understood that alternative systems may be used to define and manage the extranet client. For example, and extranet client may authenticate against the server 236 using perimeter network database authentication.

In one example, using the above system 200, and extranet client may access the portal of the perimeter network system 204 by authenticating against the server 236 using a client-side domain account or using a perimeter network database authentication. Further, the above system 200 may include a registration system that establishes an association between an extranet identity of the extranet client and an intranet business application extranet client, where the extranet client is also a business application client. The association between the extranet identification of the extranet client may be used to establish an impersonation session to enable the extranet client to successfully access and utilize the intranet business application within the secure intranet system 202. The secure intranet system 202 and the perimeter network system 204 may provide separate and independent authentication of an extranet client attempting to access and utilize the intranet business application. For example, when processing a request from an extranet client to establish a session with the intranet business application, the perimeter network system 204 may authenticate the extranet client and the authenticated extranet client may be mapped to a corresponding intranet business application identification of the extranet client. As such, the extranet client may be enabled with all relevant security authorizations of the intranet business application account associated with the intranet business application identification. An impersonation session may be established to allow the extranet client to submit requests to the intranet business application in the context of the intranet business application identification, and the intranet business application may process the requests in the context of the intranet business application identification. Further, using the above system 200, an authorization context may be created for an extranet client after the extranet client has completed and closed the authentication session, such that a request to be processed by the intranet business application may be conducted in an offline scenario where the context of the extranet client is no longer available.

Although the client system 206 is shown to include one network communication device 242, it should be understood that different numbers of network communication devices may be utilized. Likewise, the secure intranet system 202 and the perimeter network system 204 may include different numbers of servers, domain controllers and databases. It should also be understood that multiple systems may be provided, including dozens or hundreds of secure intranet systems 202, dozens or hundreds of perimeter network systems 204 and hundreds or thousands of client systems 206. Although the following disclosure generally describes the interaction between one client system 206, one perimeter network system 204 and one secure intranet system 202, it should be understood that multiple servers may operate simultaneously, each with one or more client network communication devices and/or with one or more client systems.

Figure 4:
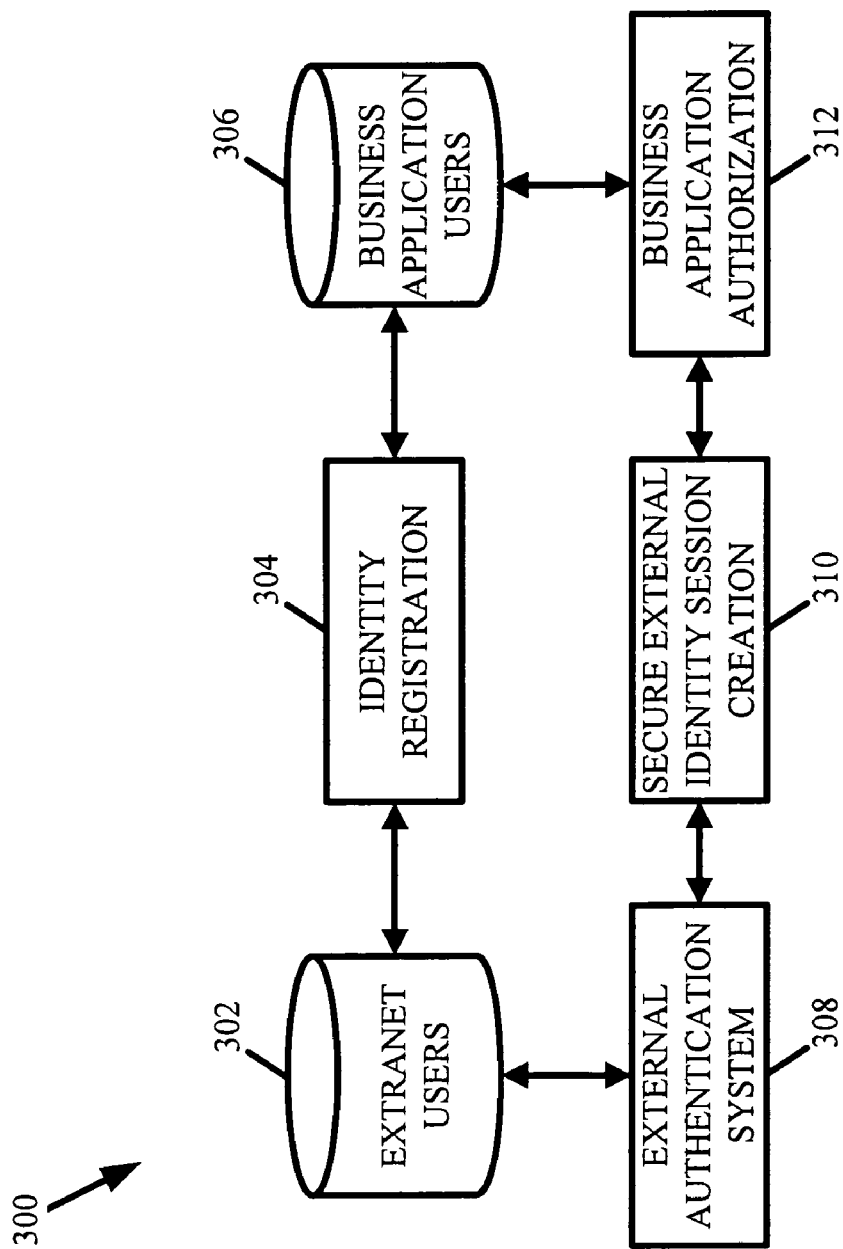
FIG. 4 is a representative block diagram of a registration system for registering an extranet client.

FIG. 4 is an exemplary depiction of a registration system 300 which may be utilized to associate an extranet identification of an extranet client with an intranet business application identification of the extranet client. Referring to FIG. 4, extranet identities of extranet clients may be maintained within a database 302, which may be the database 240 within the perimeter network system 204 or any other database outside of the secure intranet system 202. The extranet identifications may include client-side domain accounts or database domain accounts. An identity registration system 304 associates the extranet identifications of the extranet clients with corresponding intranet business application identifications of the extranet clients. The identity registration system 304 may reside in the intranet business application within the secure intranet system 202. The intranet business application identifications all the extranet clients may be maintained within a database 306, which may be the database 234 of the secure intranet system 202 or any other a database within the secure intranet system 202.

During runtime, an extranet client that possesses an extranet identification may request authentication using an external authentication system 308. The external authentication system 308 may interrogate the available extranet identifications maintained within the database 302 in response to the extranet client request. If the extranet identification is authenticated, as determined by the external authentication system 308, a secure external identity session creation system 310 may be used to attempt the creation of a session for the extranet client with the intranet business application in order to enable the extranet client to interact with the intranet business application. In particular, an Internet business application authorization system 312 may attempt to associate or match the extranet identification with a corresponding intranet business application identification of a business application user to which the extranet identification was previously registered by querying the database 306. If a match is obtained, the intranet business application authorizes the extranet client and enables the permitted level of access for the intranet business application account of the corresponding intranet business application identification. In other words, the authenticated extranet client is provided with the same authorization accorded to the intranet business application account.

Figure 5:
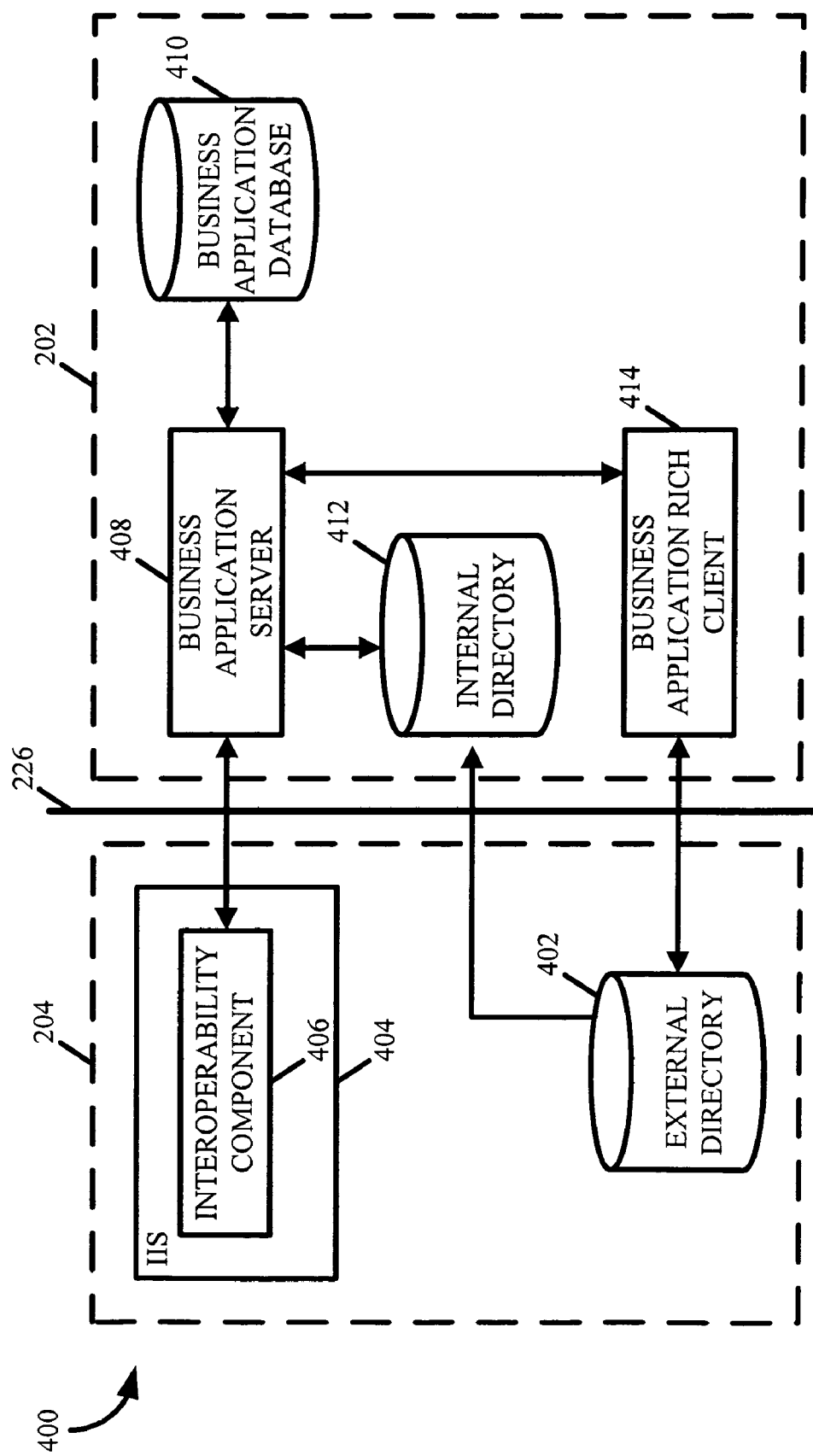
FIG. 5 is a representative block diagram of the perimeter network system and the secure intranet system of FIG. 3.

FIG. 5 represents a more detailed block diagram 400 of the secure intranet system 202 and the perimeter network system 204. In particular, FIG. 5 may demonstrate the interactions between various system elements which enable external identification registration, setting up a perimeter network proxy and using the perimeter network proxy during runtime to establish an impersonation session for an extranet client. Referring to FIG. 5, the perimeter network system 204 may include an external directory 402 which may be stored within the database 240 and an Internet information services (IIS) server 404, which may be the server 236. The secure intranet system 202 may include a business application server 408 which may be the server 230, a business application database 410 which may be the database 234, an internal directory 412 which may be stored within the database 234 and a business application rich client 414.

The IIS server 404 may host an interoperability component 406 which may enable integration with the intranet business application, and which may further assist in impersonating an intranet business application client. Extranet identifications of extranet clients may be created and stored in the external directory 402. Internal identifications of extranet clients, referred to herein as perimeter network proxy identifications, may be created and stored in the internal directory 412. In one example, the perimeter network proxy identifications may be the domain accounts for extranet clients. Because the internal directory 412 is provided within the secure intranet system 202, a one-way trust relationship may be established between the external directory 402 and the internal directory 412 such that query results from the internal directory 412 may be trusted. On the other hand, because the external directory 402 is provided within the perimeter network system 204, the internal directory 412, may not necessarily trust the external directory 402.

An internal business application client may be associated with either an extranet client or an internal user. For example, the internal business application identification of the internal business application client may be associated with the corresponding extranet identification of the extranet client or may be associated with the corresponding internal identification of the extranet client. The external directory 402 and the internal directory 412 may be queried from the business application rich client 414.

A perimeter network proxy may be created as an internal perimeter network proxy identification within the internal directory 412. The perimeter network proxy may be registered in the internal business application using the business application rich client 414 and may be stored in the business application database 410. However, the perimeter network proxy is not an internal business application user per se. Instead, the perimeter network proxy may be a domain account which is not mapped to an extranet identification of an extranet client, nor is the perimeter network proxy mapped to an intranet business application identification of a intranet business application user. In other words, the perimeter network proxy may be a special client identification which may be used to establish an impersonation session on behalf of the extranet client by impersonating a corresponding intranet business application identification of the extranet client.

During runtime, an impersonation session may be established using the perimeter network proxy, which corresponds to an authenticated extranet client. For example, an extranet client who has an internal business application account registered with the secure intranet system 202 may access and use the internal business application during the impersonation session by using the perimeter network proxy to impersonate the corresponding internal business application client. An application pool in the IIS server 404 may be configured to use the perimeter network proxy identification associated with the perimeter network proxy. The interoperability component 406 may communicate with the business application server 408 across the boundary between the perimeter network system 204 and the secure intranet system 202. Session requests may be received by the interoperability component 406 from an extranet client, and the interoperability component 406 may pass the session request to the secure intranet system 202 in order to request an impersonation session with the business application server 408 using the perimeter network proxy identification.

However, before an impersonation session is established, the perimeter network proxy identification is authenticated. In one example, the perimeter network proxy identification may be authenticated in two ways. First, the perimeter network proxy identification must exist and be active (e.g., valid) in the internal directory 412, which may be achieved by having the IIS server 404 query the internal directory 412 via the external directory 402. As such, authentication of the perimeter network proxy identification may include verifying its existence and its validity in the internal directory 412. Because of the one-way trust relationship between the external directory 402 and the internal directory 412, the query results from the internal directory 412 may be trusted by the Internet information server 404. Second, the perimeter network proxy identification must exist in the business application database 410, which may be queried by the business application server 408. As mentioned above, the perimeter network proxy is created as an internal identification stored within the internal directory 412 and registered with the business application is stored within the business application database 410. If the perimeter network proxy identification does not exist in either the external directory 402 or in the business application database 410, the perimeter network proxy identification may not be authenticated and the session request may be denied.

Figure 6:
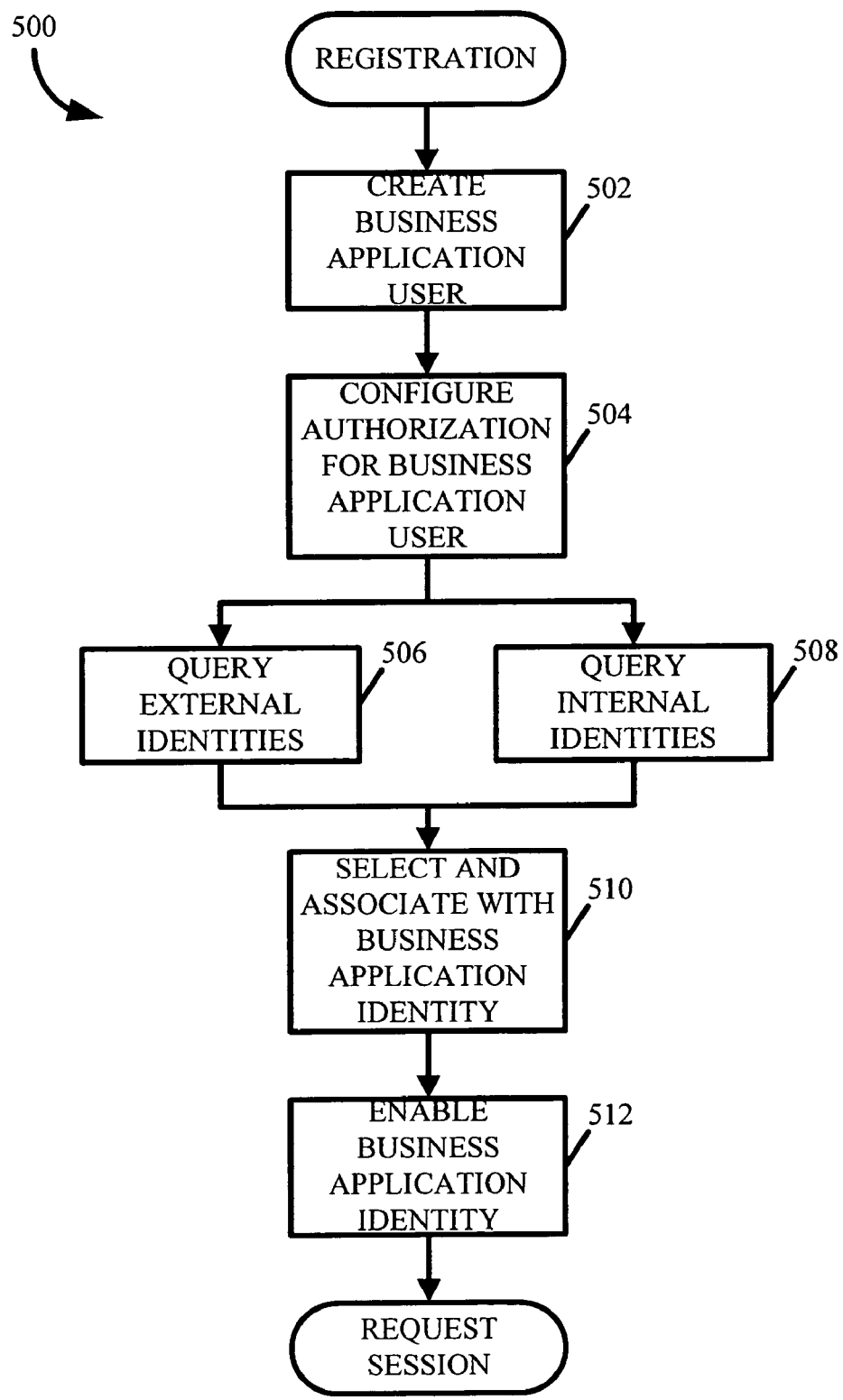
FIG. 6 is a flowchart representative of a routine for registering an intranet business application user.

FIG. 6 is an example of a registration routine 500 which may be used by the identity registration system 304 to initially register an extranet client with the intranet business application, and associate the extranet client with an intranet business application identification. Beginning at block 502, the registration routine 500 may create an intranet business application client account along with an intranet business application identification associated therewith. At block 504, security authorization for the intranet business application may be configured for the new intranet business application client account. The security authorization may correspond to one or more levels of access or permissions prescribed to the client when accessing and using the intranet business application. For example, an intranet business application client may be restricted in terms of business application features that may be accessed, the application data that may be accessed, limitations regarding time and frequency of access to the business application, and the like.

Once the intranet business application client account has been established, along with the intranet business application identification and authorization associated therewith, either the external client identities from the external directory 402 may be listed at block 506 or the internal client identities from the internal directory 412 may be listed at block 508. At block 510, one of the identities may be selected and associated with the newly created intranet business application client account. As such, the intranet business application identification and authorization may be associated with either the external identification or the internal identification. At block 512, the newly created intranet business application client account is enabled, and the extranet client may access the intranet business application.

Figure 7:
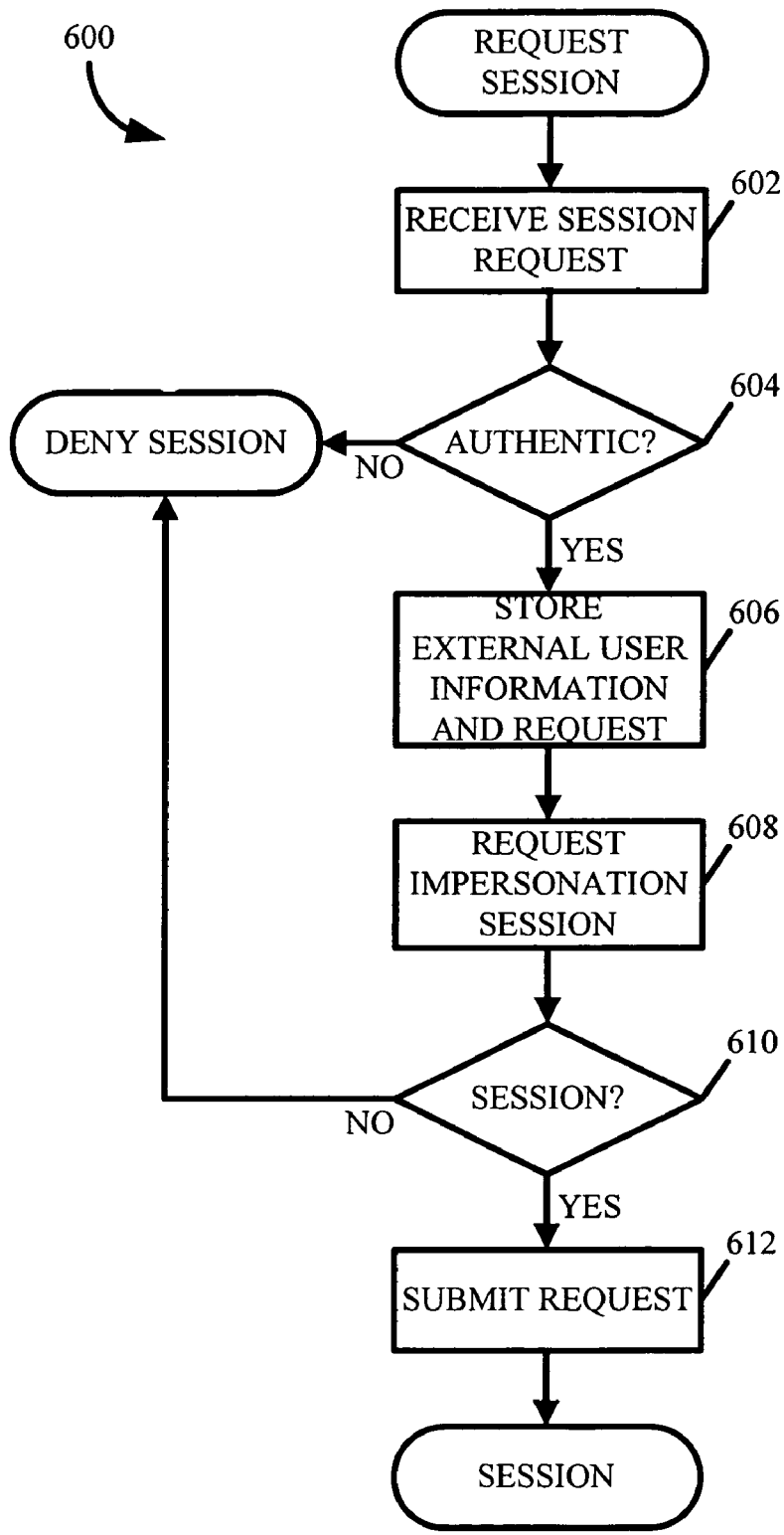
FIG. 7 is a flowchart representative of a routine for authorizing an extranet client requesting a session with the intranet business application.

FIG. 7 is an example of a session request routine 600 which may be used by the perimeter network system 204 to authorize an extranet client requesting a session with the intranet business application and establish an impersonation session for an authenticated extranet client. Referring to FIG. 7, and beginning at block 602, the perimeter network system 204, and particularly the IIS server 404, may receive a session request from the client system 206. In addition to requesting a session with the intranet business application, the request may include one or more particular requests to be processed by the intranet business application if the extranet identification is authorized, including, but not limited to, requests for data, requests for business application features, and the like. At block 604, the session request routine 600 may authenticate the extranet identification of the extranet client within the perimeter network by querying the external directory 402 and/or validating the credentials of the extranet identification. In one example, authentication of the extranet identification may be a client-side authentication or a perimeter network database authentication. If the extranet identification is not authenticated at block 406, the session request may be denied and the connection between the client system 206 and the perimeter network 204 may be terminated.

In one example, if the extranet identification is authenticated, the session request routine 600 may store the authenticated extranet identification within a secure store, such as a secure database or file, at block 606 along with the business application request(s) received at block 602. As explained further below, the stored extranet identification and business application request(s) may be utilized to process requests in an offline scenario. It is noted, however, that storing the authenticated extranet identification and request information at block 606 may not be utilized if offline requests are not permitted.

At block 608, if the extranet identification has been authenticated at block 604, the perimeter network system 204 may establish a session with the secure intranet system 202 using the perimeter network proxy. In particular, the interoperability component 406 may request an impersonation session with the business application server 408 using the perimeter network proxy. In response to the request, and as discussed further below, the secure intranet system 202 may authenticate the perimeter network proxy and provide a response to the perimeter network system 204 indicating whether the impersonation session request was successful.

The following provides two examples of methods which may be called by the perimeter network system 204 to request an impersonation session using the perimeter network proxy. Each of the methods invoke a corresponding stored procedure to request the impersonation session, as described herein. Although X++ style notation is used to describe the methods, the methods are not limited thereto.

Prefix::LogonAs("userName", "domainName", "ProxyUsername", "ProxyDomain", "ProxyPassword") or Prefix.LogonAs("userName", "domainName", "NetworkCredential"), where "userName" and "domainName" refer to the business application client who will be impersonated. "ProxyUsername," "ProxyDomain," and "ProxyPassword" are for the perimeter network proxy. "NetworkCredential" represents the credentials for the perimeter network proxy in the interoperability component.

Prefix::LogonAs("userName", "domainName") or Prefix.LogonAs("userName", "domainName") where "userName" and "domainName" refer to the business application user who will be impersonated by the perimeter network proxy. In this case, the perimeter network proxy may be determined based on the extranet client that is executing the interoperability process and the configured perimeter network proxy identification that the business application server 408 is aware of, in which case the extranet client and the perimeter network proxy should match.

If the impersonation session request was successful, as determined at block 610, the session request routine 600 may submit business application requests to the business application server 408. For example, if the initial request received at block 604 contained one or more business application requests to be processed by the intranet business application, such requests may be submitted at block 612 using the impersonation session. Alternatively, the extranet client may subsequently submit the business application requests during the impersonation session via the perimeter network system 204 using the perimeter network proxy. In yet another example, in an offline scenario, business application requests stored at block 606 may be submitted to the secure intranet system 202 at block 612. On the other hand, if the impersonation session request was denied, as determined at block 610, the session request received at block 602 may be denied and the connection between the client system 206 and the perimeter network 204 may be terminated.

Figure 8:
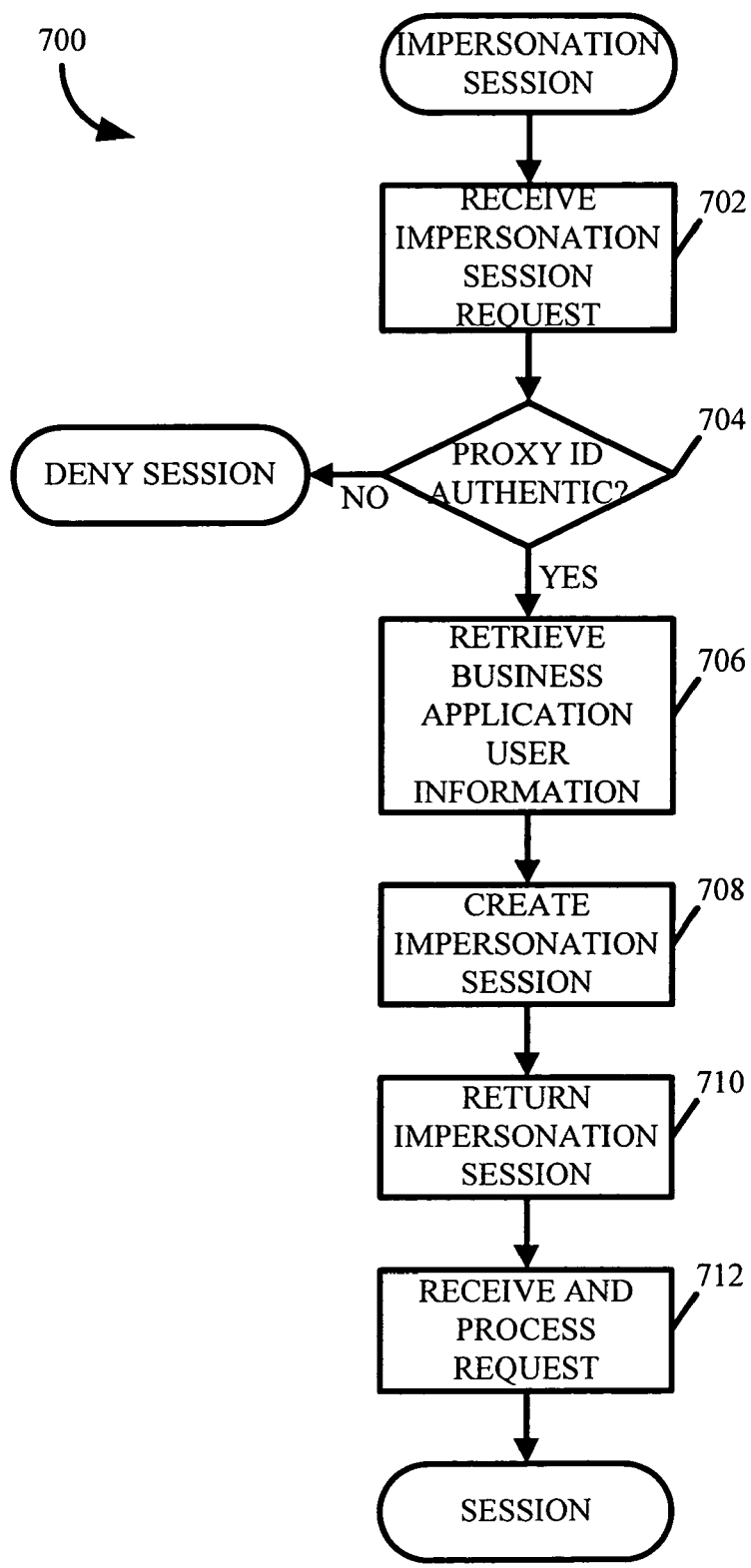
FIG. 8 is a flowchart representative of a routine for establishing an impersonation session for the extranet client.

FIG. 8 is an example of an impersonation session routine 700 which may be used by the secure intranet system 202 to establish an impersonation session for the extranet client and process and requests on behalf of all of the extranet client using impersonation. Beginning at block 702, the secure intranet system 202, and particularly the business application server 408, may receive an impersonation session request from the perimeter network system 202 as a result of the perimeter network system 202 submitting an impersonation session request using the perimeter network proxy at block 608 of the session request routine 600. In particular, the interoperability component 406 may pass the session request from the extranet client to the business application server 408 using the perimeter network proxy identification. At block 704, the secure intranet system 202, and particularly the business application database 408 authenticates the perimeter network proxy. For example, the routine 700 may validate the credentials of the perimeter network proxy by having the IIS server 404 query the internal directory 412 via the external directory 402, and further by having the business application server 408 query the business application database 410. Further, the routine 700 may verify the ability of the perimeter network proxy to impersonate an intranet business application user at block 708. If the authentication of the perimeter network proxy at block 704 is unsuccessful, the secure intranet system 202 may deny the impersonation session.

If the authorization of the perimeter network proxy is successful, at block 706 the business application server 408 may acquire information regarding the business application client associated with the intranet business application identification corresponding to the perimeter network proxy. In other words, because the perimeter network proxy corresponds to both the extranet client as identified by extranet identification and the intranet business application client as identified by the intranet business application identification, authorization of the perimeter network proxy allows the secure intranet system 202 to acquire the intranet business application account information of the extranet client, as previously registered.

Upon retrieving the business application user information at block 706, the routine may create an impersonation session for the extranet client at block 708, and transmit the impersonation session information to the perimeter network system 204 at block 710. In particular, the impersonation session may be based on the authorization of the business application client information, such that the extranet identification is accorded the same authorization as the corresponding business application identification. Thereafter, any business application requests from the extranet client are received by the business application server 408 via the IIS server 404 during the impersonation session. The business application server 408 receives and processes the business application requests as the extranet client at block 712 until the impersonation session is terminated.

As a result, an extranet identification of an extranet client authenticated by the perimeter network system 204 may be mapped to a corresponding intranet business application identification of the extranet client, as previously registered, using the perimeter network proxy. Once the extranet identification has been authenticated within the perimeter network system 204 and the perimeter network proxy identification has been authenticated within the secure intranet system 202, the extranet client may access and use the intranet business application according to the authorization associated with the intranet business application identification of the extranet client.

Figure 9:
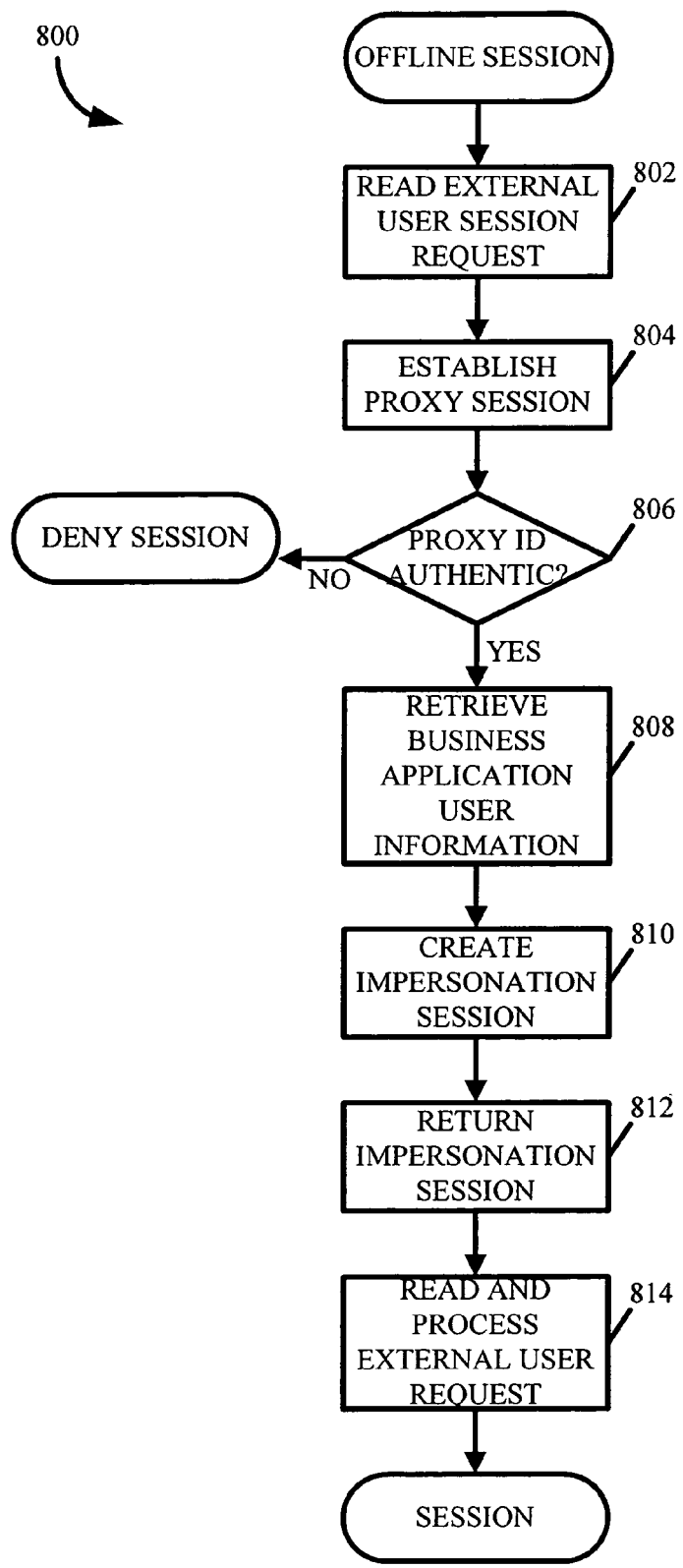
FIG. 9 is a flowchart representative of a routine for establishing an impersonation session for an offline extranet client.

FIG. 9 is an alternative example of an impersonation session routine 800 which may be used in an offline scenario if the perimeter network system 204 previously authenticated an extranet client who is now offline and stored the authenticated extranet identification and business application request information at block 606 of the session request routine 600. For example, the impersonation session routine 800 may be used in mobile scenarios where occasionally connected network devices submit business application requests. In another example, the impersonation session routine 800 may be used in an HTTP proxy relay scenario where no open ports are available from the perimeter network system 204 to the secure intranet system 202, but HTTP requests must flow into the secure intranet system 202. In yet another example, the impersonation session routine 800 may be used in FTP or other file-based scenarios where the file shared by multiple clients is dropped for subsequent use (e.g., read/write) by another client and is to be processed at a later date, and the contents of file contain transactions created by multiple clients.

Beginning at block 802, a reader service located within the secure intranet system 202 may read the authenticated extranet identification and the business application requests from the secure store. At block 804, the reader service may create a perimeter network session using the perimeter network proxy. At block 806, the business application server 408 authenticates the perimeter network proxy by validating the credentials of the perimeter network proxy and verifying the ability of the perimeter network proxy to impersonate an intranet business application client. Once the perimeter network proxy is authenticated, the business application server acquires information about the intranet business application client to impersonate at block 808, after which an impersonation session for the offline extranet client is created at block 810. The impersonation session information may be sent back to the perimeter network system 204 at block 812. Thereafter, the reader service may read each serialized request from the secure store and replay them, such that the resulting requests are sent to the business application server 408 using the impersonation session and the business application server 408 processes these requests as the extranet client at block 814 in accordance with the authorization associated with the intranet business application client until the impersonation session is terminated.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A computer-readable storage medium excluding signals having computer-executable instructions for implementing a method of authenticating and authorizing an extranet client to a secure intranet business application via a perimeter network, wherein connections to the secure intranet business application from the perimeter network or the extranet are not permitted, the computer-readable medium comprising:
    computer executable instructions for registering an extranet client with a secure intranet business application within the secure intranet by mapping an extranet identification of the extranet client to a business application identification corresponding to the extranet client, wherein the business application identification is associated with a business application client within the secure intranet, and wherein a perimeter network proxy corresponds to both the extranet identification of the extranet client and the business application identification mapped to the extranet client identification;
    computer executable instructions for receiving an impersonation session request from the perimeter network including a perimeter network proxy identification of a perimeter network proxy corresponding to an authenticated extranet client;
    computer executable instructions for authenticating the perimeter network proxy identification within the secure intranet by verifying the existence of the perimeter network proxy identification in a business application directory within the secure intranet;
    computer executable instructions for using the business application identification to acquire business application client information from the associated business application client within the secure intranet when the perimeter network proxy identification is successfully authenticated;
    computer executable instructions for creating an impersonation session with the secure intranet business application for the authenticated extranet client by using the perimeter network proxy corresponding to the authenticated extranet client to impersonate the business application identification mapped to the authenticated extranet client, such that the perimeter network proxy:
        impersonates the business application client associated with the business application identification,
        executes the secure intranet business application with the business application identification of the authenticated extranet client according to the acquired business application client information, and
        the secure intranet business application receives requests from the extranet client using the impersonation session and processes the requests as the extranet client; and
    computer executable instructions for transmitting information relating to the impersonation session to the perimeter network.

2. The computer-readable storage medium having computer-executable instructions of claim 1, further comprising:
    computer executable instructions for authenticating the extranet client within the perimeter network; and
    computer executable instructions for requesting an impersonation session with the secure intranet business application using the perimeter network proxy when the extranet identification of the extranet client is authenticated.

3. The computer-readable storage medium having computer-executable instructions of claim 2, wherein the computer executable instructions for authenticating the extranet client comprises computer executable instructions for at least one of the group consisting of: client-side authentication and perimeter network database authentication.

4. The computer-readable storage medium having computer-executable instructions of claim 1, wherein the computer executable instructions for authenticating a perimeter network proxy identification of a perimeter network proxy within the secure intranet comprises:
    computer executable instructions for verifying the existence of the perimeter network proxy identification of the perimeter network proxy in an internal directory within the secure intranet; and
    computer executable instructions for verifying the validity of the perimeter network proxy identification in the internal directory within the secure intranet.

5. The computer-readable storage medium having computer-executable instructions of claim 1, wherein the computer executable instructions for authenticating a perimeter network proxy identification of a perimeter network proxy within the secure intranet comprises:
    computer executable instructions for validating one or more credentials of the perimeter network proxy; and
    computer executable instructions for verifying the ability of the perimeter network proxy to impersonate a registered intranet business application client.

6. The computer-readable storage medium having computer-executable instructions of claim 1, further comprising computer executable instructions for authorizing the extranet client with an authorization associated with the business application identification, the authorization relating to a level of access within the secure intranet business application.

7. The computer-readable storage medium having computer-executable instructions of claim 1, wherein the computer executable instructions for creating an impersonation session with the secure intranet business application comprises computer executable instructions for creating an impersonation session with the secure intranet business application when the authenticated extranet client corresponds to the business application identification.

8. The computer-readable storage medium having computer-executable instructions of claim 1, further comprising:
    computer executable instructions for receiving a request from the extranet client via the impersonation session; and computer executable instructions for processing the request in the context of an intranet business application account associated with the business application identification.

9. The computer-readable storage medium having computer-executable instructions of claim 1, further comprising:
computer executable instructions for receiving an impersonation session request from the extranet client within the perimeter network for the impersonation session with the secure intranet business application;
computer executable instructions for authenticating an extranet client identification of the extranet client within the perimeter network;
computer executable instructions for writing the impersonation session request and the extranet client identification to a secure data store;
computer executable instructions for reading the extranet client identification from the secure data store from within the secure intranet;
wherein the computer executable instructions for creating an impersonation session with the secure intranet business application for the authenticated extranet client based on the business application client information associated with the business application client comprises computer executable instructions for creating an impersonation session with the secure intranet business application for the authenticated client based on the extranet client identification read from the secure data store.

10. A method of communicating between a requesting process within a perimeter network and a serving process within a secure intranet that does not permit connections from outside the secure intranet, the method comprising:
registering, by the serving process, an extranet client to use a secure intranet business application within the secure intranet as a business application client by mapping an extranet identification of the extranet client to a business application identification corresponding to the extranet client, wherein the business application identification is associated with a business application client within the secure intranet, and wherein a perimeter network proxy corresponds to both the extranet identification of the extranet client and the business application identification mapped to the extranet client identification;
processing a call from a perimeter network proxy to create a session for an external client authenticated within the perimeter network;
authenticating credentials of the perimeter network proxy, the perimeter network proxy comprising credentials of the business application client associated with the perimeter network proxy by verifying, by the serving process, the existence of a perimeter network proxy identification of the perimeter network proxy in a business application directory within the secure intranet;
acquiring information associated with the business application client within the secure intranet when the perimeter network proxy is authenticated, the intranet business application client corresponding to the authenticated external client;
creating an impersonation session with the secure intranet business application for the authenticated external client by using the perimeter network proxy corresponding to the authenticated extranet client to impersonate the business application identification mapped to the authenticated extranet client, such that the perimeter network proxy:
impersonates the business application client associated with the business application identification,
executes the secure intranet business application with the business application identification of the authenticated extranet client according to the acquired business application client information, and
the secure intranet business application receives requests from the extranet client using the impersonation session and processes the requests with the intranet business application identification of the authenticated the extranet client;
receiving requests for the intranet business application via the perimeter network; and
processing requests for the intranet business application as the external client.

11. The method of claim 10, further comprising:
processing, by the serving process, a call from the perimeter network proxy to create a session using a perimeter network proxy account;
wherein authenticating credentials of the perimeter network proxy further comprises authenticating, by the serving process, the ability of the perimeter network proxy to impersonate an intranet business application client.

12. The method of claim 10, further comprising:
authenticating, by the requesting process, the extranet client; and
issuing, by the requesting process, the call to create the session for the authenticated external client.

13. The method of claim 10, wherein authenticating credentials of the perimeter network proxy further comprises:
verifying, by the serving process, the existence of the perimeter network proxy identification of the perimeter network proxy in an internal directory within the secure intranet; and
verifying, by the serving process, whether the perimeter network proxy identification is active.

14. The method of claim 10, further comprising:
receiving, by the requesting process, a session request from the extranet client, the session request comprising one or more business application requests;
authenticating, by the requesting process, an extranet client identification of the extranet client;
storing, by the requesting process, the extranet client identification of the extranet client and the session request within a secure data store;
reading, by the serving process, the extranet client identification and the session request from the secure data store; and
processing, by the serving process, the one or more business application requests.

15. A computer adapted for participation in a secure intranet within a perimeter network topology, the computer comprising:
a network communication device for receiving data via a network;
a memory storing machine-readable instructions; and
a processor for executing the machine-readable instructions performing a method of establishing a session for an extranet client requesting the session from an extranet via a perimeter network,
the processor being programmed to execute machine-readable for registering an extranet client with a secure intranet business application within the secure intranet by mapping an extranet identification of the extranet client to a business application identification corresponding to the extranet client, wherein the business application identification is associated with a business application client within the secure intranet, and wherein a perimeter network proxy corresponds to both the extranet identification of the extranet client and the business application identification mapped to the extranet client identification;

the processor being programmed to execute machine-readable instructions for receiving a session request including a perimeter network proxy identification of a perimeter network proxy corresponding to an extranet client to create the session with the secure intranet business application for the external client, the session request being generated when the external client is authenticated outside of the secure intranet;

the processor being programmed to execute machine-readable instructions for authenticating credentials of the perimeter network proxy, the perimeter network proxy comprising credentials of the business application client corresponding to the authenticated extranet client;

the processor being programmed to execute machine-readable instructions for authenticating the ability of the perimeter network proxy to impersonate the business application client;

the processor being programmed to execute machine-readable instructions for using the business application identification to acquire business application information associated with the business application client within the secure intranet when the perimeter network proxy is authenticated;

the processor being programmed to execute machine-readable instructions for creating an impersonation session with the secure intranet business application for the authenticated external client by using the perimeter network proxy corresponding to the authenticated extranet client to impersonate the business application identification mapped to the authenticated extranet client, such that the perimeter network proxy:

impersonates the business application client associated with the business application identification, executes the secure intranet business application with the business application identification of the authenticated extranet client according to the acquired business application client information, and the secure intranet business application receives requests from the extranet client using the impersonation session and processes the requests with the intranet business application identification of the authenticated extranet client; and the processor being programmed to execute machine-readable instructions for executing requests for the intranet business application as the external client received via the perimeter network.

16. The computer of claim 15, further comprising:

the processor being programmed to execute machine-readable instructions for reading a stored external client identification and stored business application requests generated by the external client, the external client have been previously authenticated outside of the secure intranet and closed the authentication session outside of the secure intranet;

the processor being programmed to execute machine-readable instructions for executing the stored business application requests.

\* \* \* \* \*